(No Model.)
P. MEYER.
ATMOSPHERIC BURNER.
No. 560,911. Patented May 26, 1896.
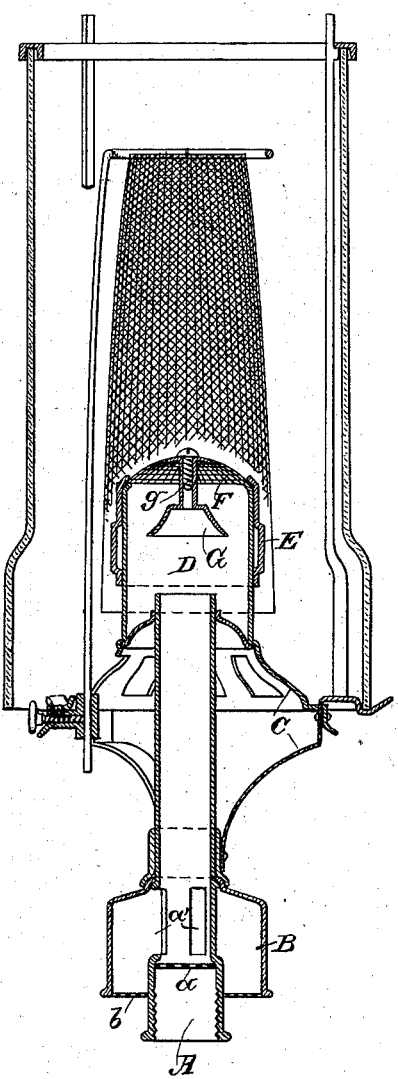

UNITED STATES PATENT OFFICE.

PHILIP MEYER, OF ALAMEDA, CALIFORNIA.

ATMOSPHERIC BURNER.

SPECIFICATION forming part of Letters Patent No. 560,911, dated May 26, 1896.

Application filed November 8, 1895. Serial No. 568,279. (No model.)

*To all whom it may concern:*

Be it known that I, PHILIP MEYER, a citizen of the United States, residing at Alameda, county of Alameda, State of California, have invented an Improvement in Atmospheric Burners; and I hereby declare the following to be a full, clear, and exact description of the same.

My invention relates to the general class of atmospheric or Bunsen burners.

It consists, primarily, in connection with the gauze diaphragm upon which the inflammable mixture is ignited, of an underlying solid deflector-plate, the object of which is to more perfectly distribute the mixture upon or against the gauze diaphragm, resulting in avoiding clogging on the interior of the burner and also in preventing the diaphragm from burning out.

It also consists, in connection with said diaphragm and deflector-plate, of an extension-chamber, to the upper portion of which the diaphragm and plate are fitted, the object of said extension-chamber being to provide sufficient space for the mixture about to be distributed and ignited, and also to prevent, by affording increased space, any tendency to clog due to the entrance of foreign matters and of insects.

It also consists in an improved air-shutter, through which the air finds entrance to mix with the gas, the object of said shutter being to effectually exclude foreign matters, especially insects, from finding their way into the burner and clogging it.

Referring to the accompanying drawing, the figure is a section of my burner.

A is the gas-inlet pipe or tube of the burner, provided in its base with the usual perforated diaphragm *a* for the proper admission of the gas, and also with the openings *a'* for the entrance of the air. Around the tube at the openings *a'* is a casing, forming the air-shutter B, through the bottom of which the air is admitted, and said air passing in through the openings *a'* forms with the gas the proper mixture. The bottom of said air-shutter is covered with gauze *b*.

C is the general frame, fitted to pipe or tube A, and D is the extension-chamber into which the upper end of said tube A fits and into which it discharges the mixture of air and gas. To the top of extension D is fitted the cap E, the upper end of which is provided with the gauze diaphragm F, on the surface of which the mixture is ignited. Below this diaphragm is the deflector-plate G, secured in proper manner, the best way being to secure it to the diaphragm by means of the screw *g*. This deflector-plate is a solid one, and though it may have any suitable shape the best form is a bell shape, as shown. Its diameter is enough less than that of the space in which it is inclosed to permit free passage of the air and gas mixture around it and up to the diaphragm. This diaphragm, with its deflector-plate and the extension-chamber D, heretofore described, is illustrated but not claimed in my application, Serial No. 563,117, filed September 20, 1895, and now pending, for an electric gas-lighter, and to which said application cross-reference is hereby made. It has been common heretofore to use two separated gauze diaphragms. These clog and there is no distribution of the inflammable mixture, or if there be it is so imperfect that the upper diaphragm soon burns out. With my improvement the solid deflector checks the direct contact of the mixture with the diaphragm and insures its outward flow and distribution equally to said diaphragm, whereby there is no tendency to clog and the diaphragm does not burn out. The extension-chamber gives ample space for the mixture, and also gives room for such foreign matters as may find their way in, thus avoiding clogging. Heretofore the base of the air-shutter B has been open, and when the burners are used in the open air insects find their way in and pass up into the burner and clog it. In my improvement I cover the open base of the shutter B with the gauze *b*, thereby excluding the insects and thus avoiding this difficulty.

Having thus described my invention, what I claim as new, and desire to secure by Letters Patent, is—

1. In an atmospheric or Bunsen burner, the combination with the gauze diaphragm at the ignition end of the burner, with an underlying solid deflector-plate.

2. In an atmospheric or Bunsen burner, the combination with the gauze diaphragm at the ignition end of the burner, with an underlying solid deflector-plate having a bell shape.

3. In an atmospheric or Bunsen burner, the combination with the gauze diaphragm at the ignition end of the burner, with an underlying solid deflector-plate suspended from said diaphragm.

4. In an atmospheric or Bunsen burner, the combination of the gauze diaphragm at the ignition end of the burner, with an underlying solid deflector-plate suspended from said diaphragm and having a bell shape.

5. In an atmospheric or Bunsen burner, the combination of the pipe or tube for conveying the inflammable mixture, the extension-chamber into which said pipe or tube enters and to which it delivers the mixture prior to ignition, and a solid deflector-plate suspended in said chamber below its top.

6. In an atmospheric or Bunsen burner, the combination of the pipe or tube for conveying the inflammable mixture, the extension-chamber into which said pipe or tube enters and to which it delivers the mixture prior to ignition, the gauze diaphragm in the top of said chamber at the point of ignition and the solid deflector-plate in the upper portion of the chamber below the diaphragm.

In witness whereof I have hereunto set my hand.

PHILIP MEYER.

Witnesses:
S. H. NOURSE,
WM. F. BOOTH.